US011522182B2

(12) United States Patent
Roh et al.

(10) Patent No.: US 11,522,182 B2
(45) Date of Patent: Dec. 6, 2022

(54) METHOD FOR PRODUCING LITHIUM MANGANESE OXIDE-BASED CATHODE ACTIVE MATERIAL (71) Applicant: LG CHEM, LTD., Seoul (KR)

(72) Inventors: Jongmin Roh, Daejeon (KR); Seokhyun Yoon, Daejeon (KR); Hosub Lee, Daejeon (KR); Byunggook Lyu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 257 days.

(21) Appl. No.: 16/646,880

(22) PCT Filed: Sep. 21, 2018

(86) PCT No.: PCT/KR2018/011262
§ 371 (c)(1),
(2) Date: Mar. 12, 2020

(87) PCT Pub. No.: WO2019/066415
PCT Pub. Date: Apr. 4, 2019

(65) Prior Publication Data
US 2020/0280066 A1    Sep. 3, 2020

(30) Foreign Application Priority Data

Sep. 26, 2017  (KR) .......... 10-2017-0124428
Sep. 20, 2018  (KR) .......... 10-2018-0113045

(51) Int. Cl.
H01M 4/02      (2006.01)
H01M 4/505     (2010.01)
(Continued)

(52) U.S. Cl.
CPC ........ H01M 4/505 (2013.01); C01G 45/1242 (2013.01); H01G 11/06 (2013.01);
(Continued)

(58) Field of Classification Search
CPC ....................................................... H01M 4/02
See application file for complete search history.

(56) References Cited

U.S. PATENT DOCUMENTS

2012/0282512 A1    11/2012  Choi
2014/0322608 A1*   10/2014  Claussen ................ C01B 32/15
                                              204/157.43
(Continued)

FOREIGN PATENT DOCUMENTS

CN       1817800 A      8/2006
CN     105692703 A      2/2014
(Continued)

OTHER PUBLICATIONS

Luo et al. ("LiMn2O4 Nanorods, Nanothorn Microspheres, and Hollow Nanospheres as Enhanced Cathode Materials of Lithium Ion Battery" J. Phys. Chem. C 2008, 112, 12051-12057).*
(Continued)

Primary Examiner — Jacob B Marks
(74) Attorney, Agent, or Firm — Dentons US LLP (57) ABSTRACT The present invention relates to a method for preparing a lithium manganese oxide-based material useful in applications such as for pseudocapacitors and lithium ions batteries. More specifically, by synthesizing manganese oxide nanoparticles and mixing them with lithium salts, and conducting stepwise heat treatment processes under optimized conditions, a lithium manganese oxide-based material with excellent specific capacitance, having a high surface area with a small size, can be prepared.

14 Claims, 6 Drawing Sheets (51) Int. Cl.
*C01G 45/12* (2006.01)
*H01G 11/06* (2013.01)
*H01G 11/46* (2013.01)
*H01M 10/0525* (2010.01)

(52) U.S. Cl.
CPC ........ *H01G 11/46* (2013.01); *H01M 10/0525* (2013.01); *C01P 2004/03* (2013.01); *C01P 2004/16* (2013.01); *C01P 2006/12* (2013.01); *C01P 2006/40* (2013.01); *H01M 2004/028* (2013.01)

(56) References Cited

U.S. PATENT DOCUMENTS

| | | | |
|---|---|---|---|
| 2017/0110765 A1* | 4/2017 | Yadav | ................ C01G 45/1228 |
| 2017/0125789 A1 | 5/2017 | Labyedh et al. | |
| 2017/0263931 A1 | 9/2017 | Wu et al. | |

FOREIGN PATENT DOCUMENTS

| | | | |
|---|---|---|---|
| CN | 103594703 A | | 6/2016 |
| CN | 106252594 A | | 12/2016 |
| JP | 10-294099 A | | 11/1998 |
| JP | 2000-72443 A | | 3/2000 |
| JP | 2012-232890 A | | 11/2012 |
| KR | 10-20010056566 A | | 7/2001 |
| KR | 10-2009-0126962 A | | 12/2009 |
| KR | 10-2011-0095006 | * | 8/2011 |
| KR | 10-20110095006 A | | 8/2011 |
| KR | 10-1092400 B1 | | 12/2011 |
| KR | 10-20120079400 A | | 7/2012 |
| KR | 10-20120123897 A | | 11/2012 |
| KR | 10-20150048026 A | | 5/2015 |
| WO | 2000-09447 A1 | | 2/2000 |
| WO | 2016082426 A1 | | 6/2016 |
| WO | WO 2016-082426 | * | 6/2016 |

OTHER PUBLICATIONS

Jiang et al., "Synthesis of Mn2O4 Nanoparticles Using Nano-Sized MnO2 Precursor and Their Electrochemistry Performance", American Scientific Publishers, vol. 16, pp. 12640-12643 (2016).

Kumar et al., "Synthesis and Characterization of MnO2 Nanoparticles using Co-precipitation Technique", International Journal of Chemistry and Chemical Engineering, vol. 3, pp. 155-160, (2013).

Chen et al., "Preparation and Characterization of Spinel LiMn2O4 nanorods as Lithium-ion Battery Cathodes", Trans. Nonferrous Met. Soc. China, vol. 20, No. 12, pp. 2309-2313, (2010).

Guan et al., "Facile synthesis of x—MnO2 nanorods at low temperature and their microwave absorption properties," Materials Chemistry and Physics, 143, 2014, pp. 1061-1068 (8 Pages).

* cited by examiner

METHOD FOR PRODUCING LITHIUM MANGANESE OXIDE-BASED CATHODE ACTIVE MATERIAL

The present application is a national phase entry pursuant to 35 U.S.C. § 371 of International Application No. PCT/KR2018/011262 filed on Sep. 21, 2018, and claims priority to and the benefit of Korean Patent Application No. 10-2017-0124428 filed on Sep. 26, 2017 and Korean Patent Application No. 10-2018-0113045 filed on Sep. 20, 2018, with the Korean Intellectual Property Office, the disclosures of which are incorporated herein by reference in their entirety.

FIELD

The present invention relates to a method for preparing a lithium manganese oxide-based cathode active material for storage devices, and particularly, to a method for preparing a lithium manganese oxide-based cathode active material with excellent specific capacitance, having a high surface area with a small size, without the need for a heat treatment process for a long time under high temperature conditions.

BACKGROUND

With a worldwide large increase in energy demand, of the demand for energy storage devices having large energy storage capacity and high output is on the rise.

Particularly, recently, there has been an increasing need for energy storage devices having optimal energy density and output. Supercapcitors are being studied as energy storage devices having higher density than existing capacitors and having higher output than common lithium ion batteries. Supercapacitors may be simply classified into electrical double layer capacitors (EDLC) and pseudocapacitors according to their energy storage mechanism. Among them, a pseudocapacitor that stores energy through the oxidation/reduction reaction of metal ions using a metal oxide as an electrode material is known to have much better specific capacitance than a carbon-based supercapacitor. Further, since organic electrolyte-based lithium ion batteries have a risk of explosion by impact and heat, studies on aqueous lithium ion batteries using an aqueous electrolyte are being actively pursued.

In order to prepare a high output high capacity electrode material, it is advantageous for the size of metal oxide used as electrode material to be reduced to increase the surface area to the largest extent possible. The surface area should be large so that the interface between electrolyte and electrode may widen and the oxidation/reduction reaction may smoothly occur. However, a metal oxide is difficult to directly apply for pseudocapacitors and batteries, because the particle size increases and the surface area decreases after a high temperature heat treatment processes, due to agglomeration of particles.

Thus, studies on a method for synthesizing an electrode material having a small size and a wide surface area even after high temperature heat treatment, with minimized energy and time, and without a complicated synthesis process, are needed.

SUMMARY

It is an object of the present invention to provide a method for preparing a lithium manganese oxide-based cathode active material that has a small size and a large specific surface area, and excellent specific capacitance, by minimizing energy and time, without a heat treatment process performed for a long time under high temperature conditions.

It is another object of the present invention to provide a lithium manganese oxide-based cathode active material prepared by the above-described method.

According to one embodiment of the invention, a method for preparing a lithium manganese oxide-based cathode active material is provided, said method including the steps of: producing manganese oxide nanoparticles using manganese salts; and mixing the manganese oxide nanoparticles with lithium salts, and heat treating the mixture at 350° C. to 430° C. for 1 hour to 3.5 hours, and then heat treating at 650° C. to 750° C. for 2.5 hours to 8 hours.

Meanwhile, according to another embodiment of the invention, a lithium manganese oxide-based cathode active material prepared by the above described method is provided.

According to the present invention, by preparing a manganese oxide having a nanostructure first, and then mixing it with lithium salts and proceeding stepwise with a heat treatment under optimum conditions, the energy and time used to synthesize a lithium manganese oxide may be reduced, and the size and surface area of a lithium manganese oxide synthesized after heat treatment may be maintained small and large respectively, and high specific capacitance may be realized.

DETAILED DESCRIPTION

As used herein, terms "first", "second", and the like are used to explain various constructional elements, and they are used only to distinguish one constructional element from other constructional elements.

Further, the terms used herein are only to explain specific embodiments, and are not intended to limit the present invention. A singular expression includes a plural expression thereof, unless it is expressly stated or obvious from the context that such is not intended. As used herein, the terms "comprise", "equipped", "have", etc. are intended to designate the existence of practiced characteristic, number, step, constructional element, or combinations thereof, and they are not intended to preclude the possibility of existence or addition of one or more other characteristics, numbers, steps, constructional elements, or combinations thereof.

Although various modifications can be made to the present invention and the present invention may have various forms, specific examples will be illustrated and explained in detail below. However, it should be understood that these are not intended to limit the present invention to a specific disclosure, and that the present invention includes all modifications, equivalents, or replacements thereof without departing from the spirit and technical scope of the invention.

Hereinafter, the present invention will be explained in detail.

According to one embodiment of the invention, a method for preparing a lithium manganese oxide-based cathode (positive electrode) active material is provided, said method including the steps of: producing manganese oxide nanoparticles using manganese salts; mixing the manganese oxide nanoparticles with lithium salts; heat treating the mixture at 350° C. to 430° C. for 1 hour to 3.5 hours; and then heat treating at 650° C. to 750° C. for 2.5 hours to 8 hours.

The present invention is characterized in that a lithium manganese oxide-based cathode active material that can be used in the cathodes of lithium ion batteries and pseudocapacitors, which are energy storage devices having high energy density and output, is easily synthesized by a simple process without conducting a high temperature heat treatment process for a long time, by synthesizing a manganese oxide having a nanostructure first, and then mixing it with lithium salts and conducting stepwise heat treatment under optimized conditions.

Previously, a lithium manganese oxide was mainly synthesized by directly mixing manganese salts and lithium salts by a dry or wet method, followed by high temperature heat treatment, but the heat treatment time for increasing the crystallinity of the lithium manganese oxide is too long, and the size of the lithium manganese oxide prepared thereby is as large, such as a few micrometers (μm) to tens of micrometers (μm), and the surface area is small, and thus it is not suitable for a pseudocapacitor that should yield high output instantaneously. Thus, in the present invention, by preparing a manganese oxide having a nanostructure first, and then mixing it with lithium salts, and proceeding with a stepwise heat treatment, energy and time used to synthesize the lithium manganese oxide can be saved, and the size and surface area of the lithium manganese oxide synthesized after heat treatment can be maintained small and large, respectively.

First, in the present invention, a manganese salt as starting material for producing manganese oxide nanoparticles, may be one or more selected from the group consisting of: manganese sulfate, manganese acetate, manganese chloride, manganese nitrate, manganese carbonate, and hydrates or mixture thereof.

According to a preferable embodiment of the invention, the step of producing manganese oxide nanoparticles may include reacting the manganese salt in the presence of an oxidizing agent, at about 50° C. or more, or about 50° C. to about 150° C., or about 50° C. to about 100° C. The reaction for producing the manganese oxide may be conducted in an aqueous solution state. Herein, a reaction time may vary according to reaction temperature and pressure conditions, and the reaction may be conducted for about 2 hours or more, or about 2 hours to about 72 hours. Further, since the step of producing manganese oxide nanoparticles does not require application of a high temperature and high pressure hydrothermal synthesis method using an autoclave and the like, the reaction may be conducted under a pressure condition of about 10 kg/cm$^2$ or less, about 1 kg/cm$^2$ to about 10 kg/cm$^2$, about 1 kg/cm$^2$ to about 3 kg/cm$^2$, or under an atmospheric pressure condition. Particularly, manganese oxide nanoparticles may be produced through a flask reaction of the manganese salt with an oxidizing agent at a temperature of about 50° C. to 100° C. or about 60° C. to 90° C. in an aqueous solution state, rather than a high temperature hydrothermal synthesis reaction. Herein, the flask reaction may be conducted under an atmospheric pressure (about 1 atm) condition. For example, the manganese salt may be reacted with an oxidizing agent in an aqueous solution state, at about 50° C. to 100° C., or about 60° C. to 90° C., overnight for about 12 hours to 18 hours, about 12 hours to 36 hours, or about 12 hours to about 24 hours.

Herein, one or more oxidizing agent is selected from the group consisting of potassium permanganate ($KMnO_4$), ammonium persulfate, hydrogen peroxide, ferric chloride, and hydrates or mixtures thereof may be used. Among them, potassium permanganate may be used, in that the formation of the crystal phase of the lithium manganese oxide may be effectively achieved, when mixing manganese oxide nanoparticles and lithium salts to produce the lithium manganese oxide.

The resulting manganese oxide nanoparticles may have an α or γ-$MnO_2$ crystal structures and nanorod shapes. The number average length of the manganese oxide nanoparticles, measured with a SEM (scanning electron microscope), may be 200 nm to 2000 nm, or 200 nm to 1000 nm, or 200 nm to 500 nm. Further, the number average width of the manganese oxide nanoparticles may be 20 nm to 100 nm, 20 nm to 50 nm, or 20 nm to 30 nm.

Commonly, manganese oxide nanoparticles grow in the shape of nanorods, nanowires, or nanoplanes in an aqueous solution state, and thus manganese oxide nanoparticles serve as a backbone when preparing lithium manganese oxide cathode active material, thereby preventing lithium manganese oxide from growing large to a size of a few micrometers. If manganese salts are mixed with lithium salts and heat treated, instead of manganese oxide nanoparticles, the lithium manganese oxide may not have a specific size and shape, and it may be formed with a size of a few micrometers. Particularly, the lithium manganese oxide exhibits charge and discharge properties by de-intercalation and intercalation, but the de-intercalation and intercalation of lithium ions are achieved only on the surface of the lithium manganese oxide. Thus, by making the lithium manganese oxide as small as possible to increase the specific surface area, specific capacitance may be maximized.

In the present invention, the manganese oxide nanoparticles thus produced and lithium salts are mixed and subjected to stepwise heat treatment under predetermined conditions, thus preparing a lithium manganese oxide-based cathode active material.

The lithium salts may be one or more selected from the group consisting of lithium hydroxide, lithium carbonate, lithium acetate, lithium chloride, lithium nitrate, and hydrates or mixtures thereof.

The manganese oxide nanoparticles and lithium salts may be mixed at a mole ratio of 2.3:0.7 to 1.7:1.3 (Mn:Li) and reacted, and for example, the mole ratio may be 2.1:0.9 to 1.9:1.1, more specifically 2.05:0.95 to 1.95:1.05. Among the lithium manganese oxide, in order for $LiMn_2O_4$ to form a structurally stable composition, manganese oxide nanoparticles and lithium salts may be mixed at the above-explained mole ratio range and reacted. If the mole ratio of manganese oxide nanoparticles and lithium salts does not fall within the above range, in addition to the structure of $LiMn_2O_4$, non-reacted manganese oxide and a structure of $Mn_2O_3$ may be produced.

After mixing manganese oxide nanoparticles and lithium salts as explained above, primary heat treatment may be conducted at 350° C. to 430° C. for 1 hour to 3.5 hours, the temperature of a sintering furnace may be continuously increased to 650° C. to 750° C., and then secondary heat treatment may be conducted at 650° C. to 750° C. for 2.5 hours to 8 hours, thus synthesizing a lithium manganese oxide having a small particle size and a large surface area, and excellent specific capacitance.

The primary heat treatment is conducted at a temperature of 350° C. or more, and then the manganese oxide-lithium salt mixture begins to be converted into a structure of $LiMn_2O_4$ at a temperature of 350° C. or more. More specifically, at a temperature of less than 350° C., such conversion into the $LiMn_2O_4$ structure may not occur. Thereafter, if a temperature is increased to 650° C. or more, $LiMn_2O_4$ crystal seeds formed in the above-mentioned mixture may grow large, and the whole mixture may be converted into $LiMn_2O_4$. However, at a temperature of 750° C. or more, although the $LiMn_2O_4$ crystal seeds grow faster, a structure of $Mn_3O_4$ begins to grow, in addition to the $LiMn_2O_4$. Further, if primary heat treatment is conducted at a high temperature of greater than 430° C., more $LiMn_2O_4$ crystal seeds may be generated than in the temperature range of 350° C. or more and 430° C. or less. However, if a temperature of 650° C. or more is applied later through the second heat treatment, finally, the $LiMn_2O_4$ crystal size may become smaller than in the mixture primarily heat-treated in the temperature range of 350° C. or more and 430° C. or less, and thus electrochemical performance may decrease compared to $LiMn_2O_4$ with a large crystal size. For example, the larger the size of a $LiMn_2O_4$ single crystal, the higher the crystallinity, and the higher the crystallinity, the better the electrochemical performance. To the contrary, in the case of a $LiMn_2O_4$ polycrystal including small gathered single crystals, since charge transfer resistance between the grain boundaries between the crystals is high, electrochemical performance is not good compared to a single crystal.

Herein, the primary heat treatment process corresponds to a process for producing $LiMn_2O_4$ crystal seeds, and it may be conducted at 350° C. to 430° C. or 370° C. to 420° C. for 1 hour to 3.5 hours, or at 380° C. to 415° C. for 1.5 hours to 2.5 hours. Particularly, the temperature for the primary heat treatment process should be conducted at 350° C. or more so as to previously produce $LiMn_2O_4$ crystal seeds, and should be conducted at 430° C. or less so as to maintain the number of small $LiMn_2O_4$ crystal seeds. The temperature and time of the primary heat treatment process maintains a complementary relationship, and it is preferable that in the case where a low heat treatment temperature is applied, a long heat treatment time is applied, and in case where a high heat treatment temperature is applied, a short heat treatment time is applied. For example, in case the primary heat treatment process temperature is 350° C. to 390° C., a heat treatment time of 2 hours to 3.5 hours may be applied. In addition, in case the primary heat treatment process temperature is 390° C. to 430° C., a heat treatment time of 1 hour to 2 hours may be applied. However, the primary heat treatment process should be conducted for more than 1 hour so that the production of $LiMn_2O_4$ crystal seeds may begin, and should be conducted for 3.5 hours or less so as to maintain the number of small $LiMn_2O_4$ crystal seeds.

After conducting the primary heat treatment process, the temperature of a sintering furnace may be raised to a high temperature to conduct a secondary heat treatment process. The secondary heat treatment process corresponds to a process for growing the $LiMn_2O_4$ crystal seeds produced in the primary heat treatment process, and it should be conducted at: 650° C. to 750° C., or 660° C. to 740° C., for 2.5 hours to 8 hours; 675° C. to 725° C. for 3 hours to 6 hours; or 680° C. to 715° C. for 3.5 hours to 5 hours. Particularly, the secondary heat treatment process should be conducted at 650° C. or more so as to rapidly grow the $LiMn_2O_4$ crystal seeds, and should be conducted at 750° C. or less so that $Mn_3O_4$ crystals may not be produced in addition to $LiMn_2O_4$. The temperature and time of the secondary heat treatment process maintain a complementary relationship, and it is preferable that in case where a low heat treatment temperature is applied, a long heat treatment time is applied, and in case where a high heat treatment temperature is applied, a short heat treatment time is applied. For example, in case the secondary heat treatment process temperature is 650° C. to 700° C., the heat treatment time may be 4 hours to 8 hours. Further, in case the secondary heat treatment process temperature is 700° C. to 750° C., the heat treatment time may be 2.5 hours to 4 hours. However, the secondary heat treatment should be conducted for 2.5 hours or more so that all the $LiMn_2O_4$ crystals may sufficiently grow, and should be conducted for 8 hours or less so that a LiMn$_2$O$_4$ nanorod shape may be maintained after all the LiMn$_2$O$_4$ crystals are grown. Particularly, if the secondary heat treatment process is conducted for too long, the LiMn$_2$O$_4$ nanoparticles may begin to agglomerate, and decrease the surface area.

The heat treatment step may be conducted under an atmosphere containing oxygen or air. Particularly, it is preferable that the heat treatment process is conducted under an oxygen-containing condition, so that a mixture of manganese oxide nanoparticles and lithium salts react properly to effectively produce the lithium manganese oxide during the heat treatment, and the manganese oxide nanoparticles may not be reduced to MnO with disappearance of the nanostructures.

For a specific preparation method of the lithium manganese oxide-based cathode active material, examples described below may be referred to. However, a method of preparing lithium manganese oxide-based cathode active material is not limited to the description of the specification, the preparation method may further adopt steps commonly used in the art, and the step(s) of the preparation method may be modified by commonly modifiable step(s).

Meanwhile, according to another embodiment of the invention, a lithium manganese oxide-based cathode active material prepared by the above-explained method is provided.

The lithium manganese oxide-based cathode active material may be represented by the following Chemical Formula 1, and for example, it may be LiMn$_2$O$_4$, Li$_{1.05}$Mn$_{1.95}$O$_4$, Li$_{1.12}$Mn$_{1.88}$O$_4$, Li$_{1.24}$Mn$_{1.76}$O$_4$, and the like.

[Chemical Formula 1]

In Chemical Formula 1,
x is a real number in a range of 0.7 to 1.3, or 0.85 to 1.15,
y is a real number in a range of 1.7 to 2.3, or 1.85 to 2.15, and
z may be determined according to the oxidation numbers of x and y, and for example, it is an integer of 1 to 4, preferably 4.

Particularly, as explained above, by synthesizing manganese oxide nanoparticles and then mixing them with lithium salts and conducting stepwise heat treatment processes under optimized conditions, the lithium manganese oxide-based cathode active material according to the present invention has nanoparticle and rod structures having a relatively large specific surface area, instead of an amorphous structure of a few micrometers having a small specific surface area, previously obtained by mixing manganese salts and lithium salts and then conducting a heat treatment process. More specifically, such structural characteristics may maximize the intercalation and de-intercalation of lithium ions due to a small size of nanometers and a large surface area.

For example, the lithium manganese oxide-based cathode active material may have a surface area measured by BET, of 5 m$^2$/g to 30 m$^2$/g, preferably 15 m$^2$/g or more or 15 m$^2$/g to 30 m$^2$/g.

The lithium manganese oxide-based cathode active material may have nanoparticle and rod shapes, and the number average length measured by a SEM (scanning electron microscope) may be 100 nm to 500 nm, preferably 100 nm to 300 nm, and more preferably 100 to 200 nm. The number average width may be 20 nm to 200 nm, preferably 20 nm to 100 nm, and more preferably 20 nm to 50 nm. Particularly, since the intercalation and de-intercalation of lithium occur on the surface, and then the lithium ions are diffused inside, as the number average width rather than the number average length is smaller, lithium ions may be more easily diffused inside of the lithium manganese oxide, and specific capacitance may be higher.

In order to measure the electrical properties of the lithium manganese oxide-based cathode active material according to one embodiment of the present invention, a solution in which a cathode active material, acetylene black as a conductive material for transferring a current, and polyvinylidene fluoride as a binder for fixing particles are mixed at weight ratio of 7:2:1 in NMP (N-methyl-2-pyrrolidone) may be coated on a carbon electrode and dried, and then specific capacitance may be measured by cyclic voltammetry. Herein, the specific capacitance of a test ink using a lithium manganese oxide-based cathode active material, measured by cyclic voltammetry, may be 243 F/g or more, or 243 F/g to 300 F/g, preferably 245 F/g or more, or 245 F/g to 300 F/g in a 1 M lithium sulfate (Li$_2$SO$_4$) electrolyte. Particularly, when calculating only based on active material, it may be 286 F/g or more, or 286 F/g to 429 F/g.

In the present invention, since particulars other than those described above may be adjusted as necessary, they are not specifically limited.

Hereinafter, preferable examples are presented for better understanding of the present invention. However, these examples are presented only as illustrations of the present invention, and the scope of the present invention is not limited thereby.

EXAMPLES

Example 1

1-1. Synthesis of MnO$_2$

MnO$_2$ particles in the shape of nanorods were prepared through a flask reaction as follows.

First, 10 mmol of MnSO$_4$.H$_2$O and 10 mmol of KMnO$_4$ were mixed with 100 mL of water to prepare an aqueous solution, and then the solution was stirred at room temperature and atmospheric pressure for about 30 minutes. Thereafter, while stirring the mixed aqueous solution under atmospheric pressure and a temperature of about 80° C. overnight (for about 12 hours to 18 hours), a thermal reaction was conducted to produce MnO$_2$ nanoparticles in the shape of nanorods having a number average width of about 30 nm and a number average length of about 500 nm.

1-2. Synthesis of LiMn$_2$O$_4$

The MnO$_2$ nanoparticles synthesized in step 1-1 and LiOH.H$_2$O were mixed with ethanol at a mole ratio of 2:1, and then ethanol was evaporated to obtain a homogeneous MnO$_2$—LiOH.H$_2$O mixed powder. The obtained MnO$_2$—LiOH.H$_2$O mixed powder was heat-treated under an air atmosphere at about 400° C. for about 2 hours, and then the temperature was raised to about 700° C., and additional heat treatment was conducted for about 4 hours to obtain LiMn$_2$O$_4$ nanoparticles maintaining nanorod shapes with a number average width of about 50 nm and a number average length of about 300 nm.

Figure 1:
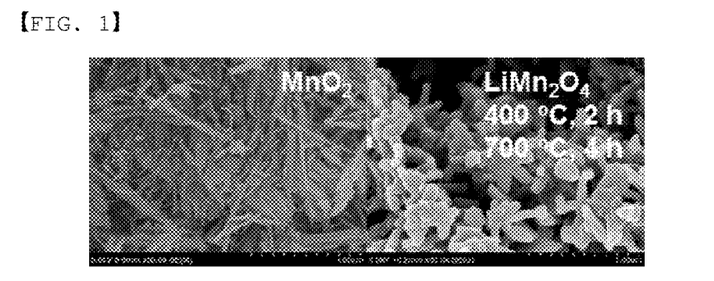
FIG. 1 shows SEM photographs taken at a magnification of 50000 times of the $MnO_2$ and $LiMn_2O_4$ nanoparticles prepared according to Example 1 (left: $MnO_2$, right: $LiMn_2O_4$).

For the MnO$_2$ nanoparticles produced in step 1-1 and the LiMn$_2$O$_4$ nanoparticles produced in step 1-2, photographs were taken with a SEM (scanning electron microscope) and are shown in FIG. 1 (left: MnO$_2$ nanoparticles, right: LiMn$_2$O$_4$ nanoparticles). Particularly, it can be confirmed that as MnO$_2$ is converted into LiMn$_2$O$_4$, although the nanorods become shorter and thicker, the nanostructure is maintained.

Figure 2:
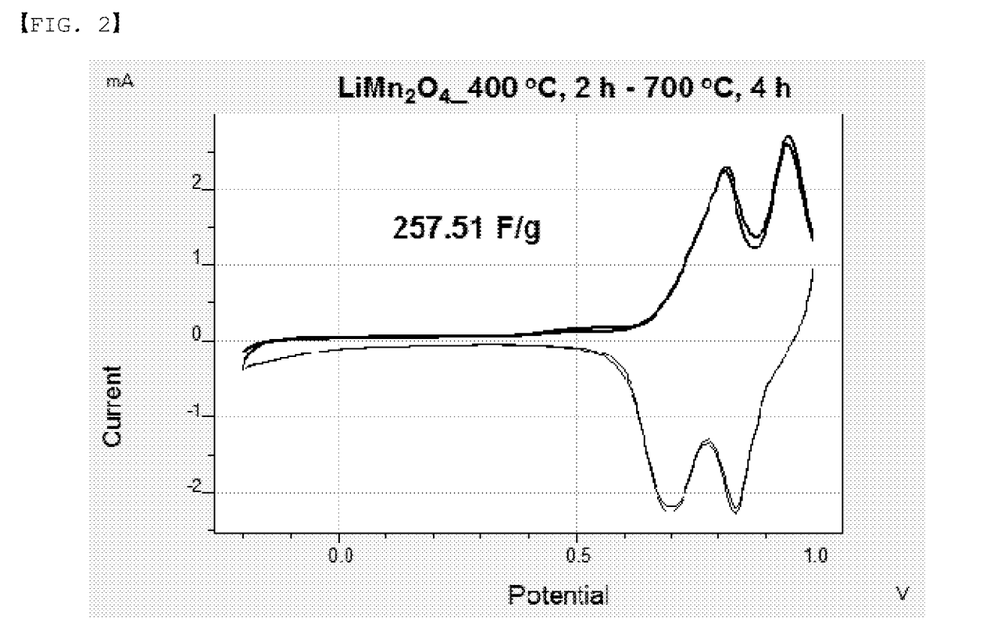
FIG. 2 is a CV graph determined by cyclic voltammetry, for the cathode electrode for a pseudocapacitor prepared using the cathode active material including the $LiMn_2O_4$ nanoparticles prepared according to Example 1 (x axis: potential, y axis: current, specific capacitance: 257.51 F/g).

Further, the produced $LiMn_2O_4$ nanoparticles were mixed with acetylene black as a conductive material for transferring a current and polyvinylidene fluoride as a binder for fixing particles at a weight ratio of 7:2:1 in NMP (N-methyl-2-pyrrolidone), and the solution was coated on a carbon electrode and dried to prepare a cathode electrode for a pseudocapacitor. For the cathode electrode for a pseudocapacitor prepared using $LiMn_2O_4$ nanoparticles, a CV graph was determined by cyclic voltammetry (CV) and is shown in FIG. 2. Herein, the specific capacitance measured by cyclic voltammetry was as high as 257.51 F/g.

Example 2

$LiMn_2O_4$ nanoparticles in the shape of somewhat blunt nanorods having a number average width of about 50 nm and a number average length of about 400 nm were prepared by the same method as Example 1, except that $MnSO_4 \cdot H_2O$ was modified to manganese acetate to prepare $MnO_2$ nanoparticles in step 1-1 of Example 1.

For a cathode electrode for a pseudocapacitor prepared using a lithium manganese oxide-based cathode active material including the produced $LiMn_2O_4$ nanoparticles, specific capacitance measured by cyclic voltammetry was confirmed to be 253.45 F/g.

Example 3

$LiMn_2O_4$ nanoparticles in the shape of nanorods having a number average width of about 30 nm and a number average length of about 500 nm were prepared by the same method as Example 1, except that $KMnO_4$ was modified to ammonium persulfate to prepare $MnO_2$ nanoparticles in step 1-1 of Example 1.

For a cathode electrode for a pseudocapacitor prepared using a lithium manganese oxide-based cathode active material including the produced $LiMn_2O_4$ nanoparticles, specific capacitance measured by cyclic voltammetry was confirmed to be 245.76 F/g.

Example 4

$LiMn_2O_4$ nanoparticles maintaining a nanorod shape with a number average width of about 30 nm and a number average length of about 500 nm were prepared by the same method as Example 1, except that the synthesis temperature was modified to 100° C. to prepare $MnO_2$ nanoparticles in step 1-1 of Example 1.

For a cathode electrode for a pseudocapacitor prepared using a lithium manganese oxide-based cathode active material including the produced $LiMn_2O_4$ nanoparticles, specific capacitance measured by cyclic voltammetry was confirmed to be 247.92 F/g.

Example 5

$LiMn_2O_4$ nanoparticles maintaining a nanorod shape with a number average width of about 30 nm and a number average length of about 500 nm were prepared by the same method as Example 1, except that the synthesis time was modified to 36 hours to prepare $MnO_2$ nanoparticles in step 1-1 of Example 1.

For a cathode electrode for a pseudocapacitor prepared using a lithium manganese oxide-based cathode active material including the produced $LiMn_2O_4$ nanoparticles, specific capacitance measured by cyclic voltammetry was confirmed to be 248.24 F/g.

Example 6

$LiMn_2O_4$ nanoparticles maintaining a nanorod shape with a number average width of about 50 nm and a number average length of about 300 nm were prepared by the same method as Example 1, except that $MnO_2$ nanoparticles and $LiOH \cdot H_2O$ were mixed at a mole ratio of 2.1:1.9, and then a heat treatment process was conducted in step 1-2 of Example 1.

For a cathode electrode for a pseudocapacitor prepared using a lithium manganese oxide-based cathode active material including the produced $LiMn_2O_4$ nanoparticles, specific capacitance measured by cyclic voltammetry was confirmed to be 256.72 F/g.

Example 7

$LiMn_2O_4$ nanoparticles maintaining a nanorod shape with a number average width of about 60 nm and a number average length of about 300 nm were prepared by the same method as Example 1, except that $MnO_2$—$LiOH \cdot H_2O$ mixed powder was heat treated under an air atmosphere at about 430° C. for 2 hours, and then the temperature was raised to about 750° C. and additional heat treatment was conducted for about 4 hours in step 1-2 of Example 1.

For a cathode electrode for a pseudocapacitor prepared using a lithium manganese oxide-based cathode active material including the produced $LiMn_2O_4$ nanoparticles, specific capacitance measured by cyclic voltammetry was confirmed to be 256.12 F/g.

Example 8

$LiMn_2O_4$ nanoparticles maintaining a nanorod shape with a number average width of about 40 nm and a number average length of about 400 nm were prepared by the same method as Example 1, except that a $MnO_2$—$LiOH \cdot H_2O$ mixed powder was heat treated under an air atmosphere at about 400° C. for 1 hour, and then the temperature was raised to about 700° C. and additional heat treatment was conducted for about 2.5 hours in step 1-2 of Example 1.

For a cathode electrode for a pseudocapacitor prepared using a lithium manganese oxide-based cathode active material including the produced $LiMn_2O_4$ nanoparticles, specific capacitance measured by cyclic voltammetry was confirmed to be 251.35 F/g.

Example 9

$LiMn_2O_4$ nanoparticles maintaining a nanorod shape with a number average width of about 50 nm and a number average length of about 300 nm were prepared by the same method as Example 1, except that a $MnO_2$—$LiOH \cdot H_2O$ mixed powder was heat treated under an air atmosphere at about 350° C. for about 3.5 hours, and then the temperature was raised to about 700° C. and additional heat treatment was conducted for about 4 hours in step 1-2 of Example 1.

For a cathode electrode for a pseudocapacitor prepared using a lithium manganese oxide-based cathode active material including the produced $LiMn_2O_4$ nanoparticles, specific capacitance measured by cyclic voltammetry was confirmed to be 253.35 F/g.

Example 10

$LiMn_2O_4$ nanoparticles maintaining a nanorod shape with a number average width of about 40 nm and a number average length of about 500 nm were prepared by the same method as Example 1, except that a $MnO_2$—$LiOH \cdot H_2O$ mixed powder was heat treated under an air atmosphere at about 400° C. for about 2 hours, and then the temperature was raised to about 650° C. and additional heat treatment was conducted for about 8 hours in step 1-2 of Example 1.

For a cathode electrode for a pseudocapacitor prepared using a lithium manganese oxide-based cathode active material including the produced $LiMn_2O_4$ nanoparticles, specific capacitance measured by cyclic voltammetry was confirmed to be 251.07 F/g.

Comparative Example 1

$LiMn_2O_4$ nanoparticles in the shape of nanorods with a number average width of about 30 nm and a number average length of about 500 nm were prepared by the same method as Example 1, except that a $MnO_2$—$LiOH \cdot H_2O$ mixed powder was heat treated under an air atmosphere at about 400° C. for about 2 hours, and then the temperature was raised to about 700° C. and additional heat treatment was conducted for a reduced time of about 2 hours in step 1-2 of Example 1.

Figure 3:
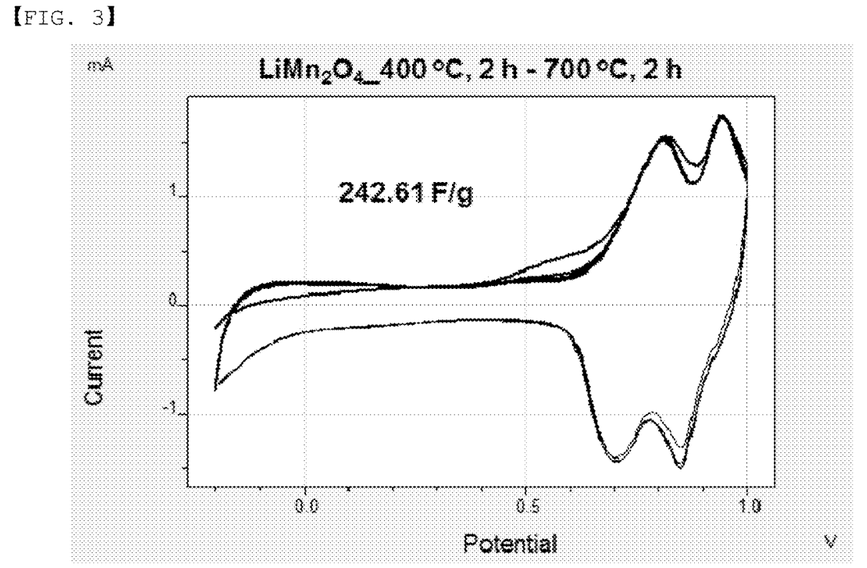
FIG. 3 is a CV graph determined by cyclic voltammetry, for the cathode electrode for a pseudocapacitor prepared using the cathode active material including the $LiMn_2O_4$ nanoparticles prepared according to Comparative Example 1 (x axis: potential, y axis: current, specific capacitance: 242.61 F/g).

For a cathode electrode for a pseudocapacitor prepared using a lithium manganese oxide-based cathode active material including the produced $LiMn_2O_4$ nanoparticles, a CV graph was determined by cyclic voltammetry (CV) and is shown in FIG. 3. Herein, the specific capacitance measured by cyclic voltammetry was confirmed to be 242.61 F/g. Particularly, it can be seen that in the case of Comparative Example 1, since the crystallinity of $LiMn_2O_4$ nanoparticles is not good, specific capacitance is remarkably lowered, compared to Example 1 using the same reactants $MnSO_4 \cdot H_2O$ and $KMnO_4$.

Comparative Example 2

$LiMn_2O_4$ nanoparticles in the shape of nanorods with a number average width of about 30 nm and a number average length of about 500 nm were prepared by the same method as Example 1, except that a $MnO_2$—$LiOH \cdot H_2O$ mixed powder was heat treated under an air atmosphere at about 400° C. for a prolonged time of about 4 hours, and then the temperature was raised to about 700° C. and additional heat treatment was conducted for about 4 hours in step 1-2 of Example 1.

Figure 4:
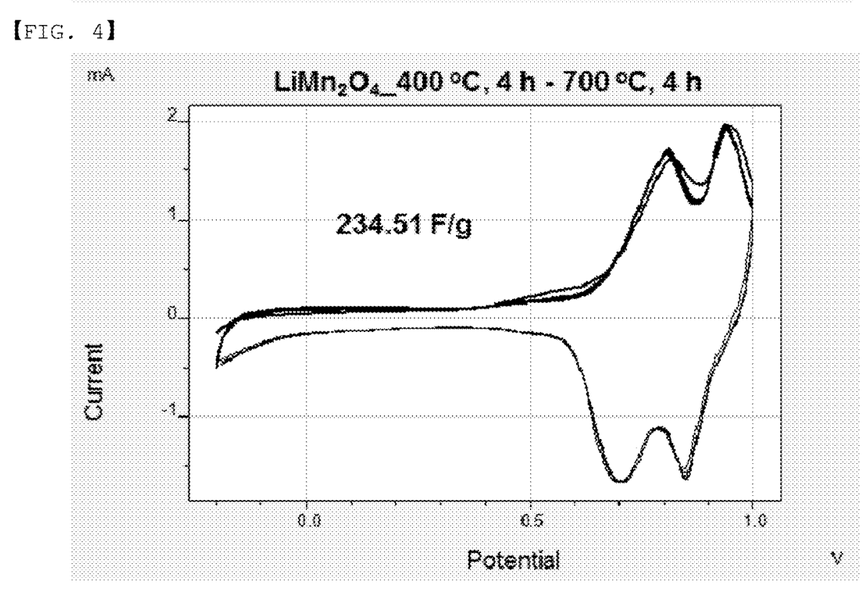
FIG. 4 is a CV graph determined by cyclic voltammetry, for the cathode electrode for a pseudocapacitor prepared using the cathode active material including the $LiMn_2O_4$ nanoparticles prepared according to Comparative Example 2 (x axis: potential, y axis: current, specific capacitance: 234.51 F/g).

For a cathode electrode for a pseudocapacitor prepared using a lithium manganese oxide-based cathode active material including the produced $LiMn_2O_4$ nanoparticles, a CV graph was determined by cyclic voltammetry (CV) and is shown in FIG. 4. Herein, the specific capacitance measured by cyclic voltammetry was confirmed to be 234.51 F/g. Particularly, it can be seen that in the case of Comparative Example 2, although the heat treatment time at 400° C. was prolonged to 4 hours, on the contrary, specific capacitance was remarkably lowered, compared to Example 1 using the same reactants $MnSO_4 \cdot H_2O$ and $KMnO_4$.

Comparative Example 3

$LiMn_2O_4$ nanoparticles in the shape of nanorods with a number average width of about 30 nm and a number average length of about 500 nm were prepared by the same method as Example 1, except that a $MnO_2$—$LiOH \cdot H_2O$ mixed powder was directly heat treated at about 700° C. for about 4 hours without heat treatment under an air atmosphere at about 400° C. in step 1-2 of Example 1.

Figure 5:
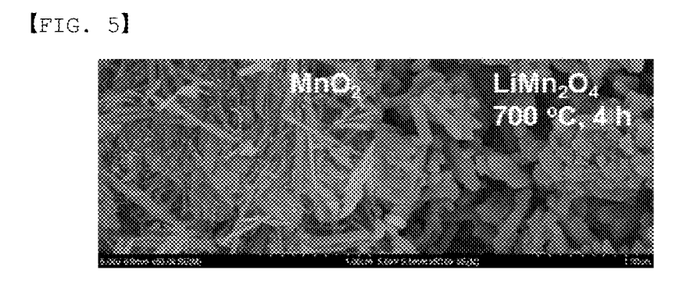
FIG. 5 shows SEM photographs taken at magnification of times 50000 of the $MnO_2$ and $LiMn_2O_4$ nanoparticles prepared according to Comparative Example 3 (left: $MnO_2$, right: $LiMn_2O_4$).
Figure 6:
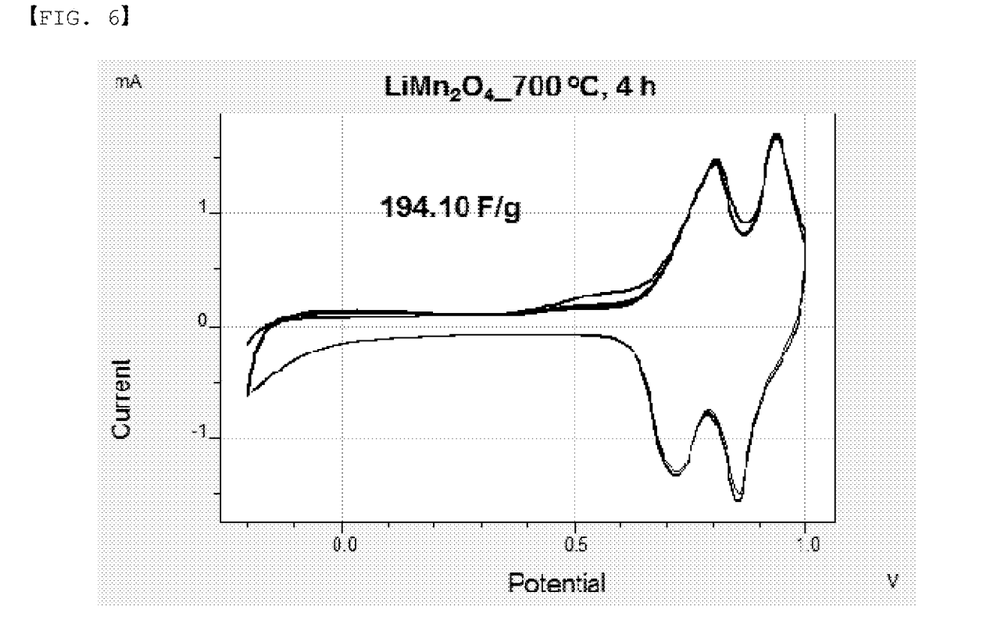
FIG. 6 is a CV graph determined by cyclic voltammetry, for the cathode electrode for a pseudocapacitor prepared using the cathode active material including the $LiMn_2O_4$ nanoparticles prepared according to Comparative Example 3 (x axis: potential, y axis: current, specific capacitance: 194.10 F/g).

For the produced $MnO_2$ nanoparticles and $LiMn_2O_4$ nanoparticles, photographs were taken with a SEM (scanning electron microscope) and are shown in FIG. 5 (left: $MnO_2$ nanoparticles, right: $LiMn_2O_4$ nanoparticles). For a cathode electrode for a pseudocapacitor prepared using a lithium manganese oxide-based cathode active material including the produced $LiMn_2O_4$ nanoparticles, a CV graph was determined by cyclic voltammetry (CV) and is shown in FIG. 6. Herein, the specific capacitance measured by cyclic voltammetry was confirmed to be 194.10 F/g. Particularly, it was confirmed that the particle shapes of $MnO_2$ and $LiMn_2O_4$ prepared according to Comparative Example 3 are not significantly different from the $MnO_2$ and $LiMn_2O_4$ prepared according to Example 1, but the specific capacitance is remarkably lowered.

Comparative Example 4

4-1. Synthesis of $MnO_2$ $MnO_2$ particles in the shape of nanorods were prepared by the following hydrothermal synthesis method.

First, 10 mmol $MnSO_4 \cdot H_2O$, and 10 mmol $KMnO_4$ were mixed with 100 mL of water to prepare an aqueous solution, and then the solution was stirred at room temperature and atmospheric pressure for about 30 minutes. Thereafter, the mixed aqueous solution was put into an autoclave operated under an internal pressure of about 3.8 bar, and a hydrothermal synthesis process of high temperature and high pressure was conducted under an internal temperature of about 160° C. for about 6 hours to produce $MnO_2$ nanoparticles in the shape of nanorods having a number average width of about 40 nm and a number average length of about 700 nm.

4-2. Synthesis of $LiMn_2O_4$

The $MnO_2$ nanoparticles synthesized by hydrothermal synthesis in step 4-1 and $LiOH \cdot H_2O$ were mixed with ethanol at a mole ratio of 2:1, and then ethanol was evaporated to obtain a homogeneous $MnO_2$—$LiOH \cdot H_2O$ mixed powder. The obtained $MnO_2$—$LiOH \cdot H_2O$ mixed powder was directly heat-treated at about 700° C. for about 4 hours without heat treatment under an air atmosphere at about 400° C., thus preparing $LiMn_2O_4$ nanoparticles maintaining nanorod shapes with a number average width of about 70 nm and a number average length of about 400 nm.

Figure 7:
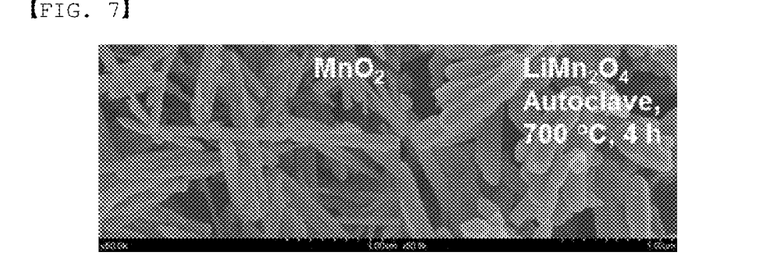
FIG. 7 shows SEM photographs taken at magnification of 50000 times of the $MnO_2$ and $LiMn_2O_4$ nanoparticles prepared according to Comparative Example 4 (left: $MnO_2$, right: $LiMn_2O_4$).
Figure 8:
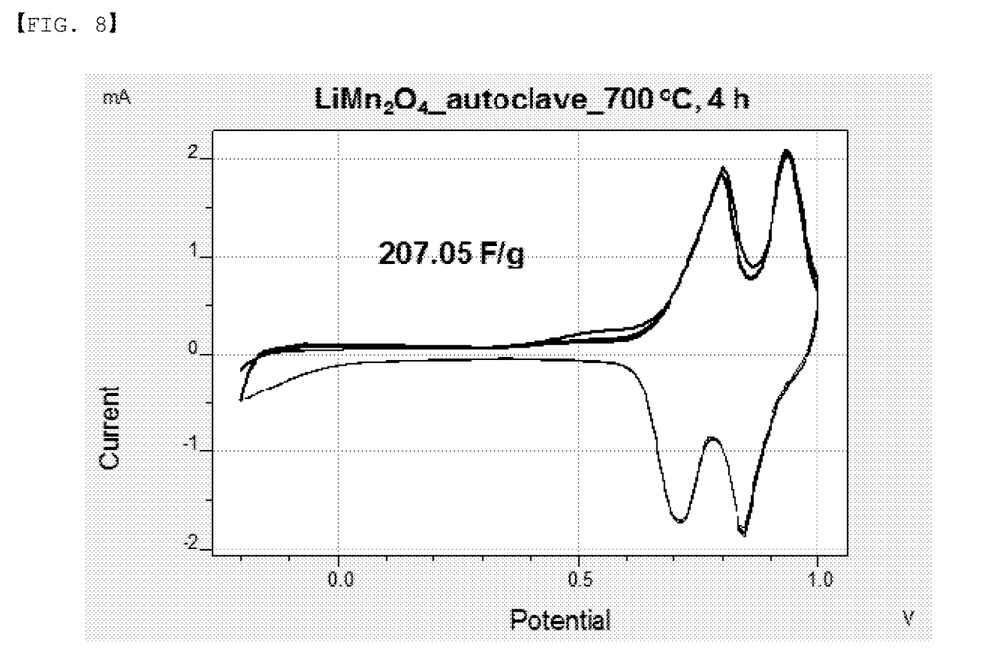
FIG. 8 is a CV graph determined by cyclic voltammetry, for the cathode electrode for a pseudocapacitor prepared using the cathode active material including the $LiMn_2O_4$ nanoparticles prepared according to Comparative Example 4 (x axis: potential, y axis: current, specific capacitance: 207.05 F/g).

For the $MnO_2$ nanoparticles produced by the hydrothermal synthesis method in step 4-1 and the $LiMn_2O_4$ nanoparticles produced in step 4-2, photographs were taken by a SEM (scanning electron microscope) and are shown in FIG. 7 (left: $MnO_2$ nanoparticles, right: $LiMn_2O_4$ nanoparticles). For a cathode electrode for a pseudocapacitor prepared using a lithium manganese oxide-based cathode active material including the produced $LiMn_2O_4$ nanoparticles, a CV graph was determined by cyclic voltammetry (CV) and is shown in FIG. 8. Herein, the specific capacitance measured by cyclic voltammetry was confirmed to be 207.05 F/g.

Particularly, in the case of Comparative Example 4, the process cost is increased due to the synthesis of $MnO_2$ by a hydrothermal synthesis method, and since the produced $MnO_2$ nanoparticles are larger than those produced by the flask reaction, the size of $LiMn_2O_4$ nanoparticles produced by mixing them with lithium salts and heat treating also increases. Therefore, based on the same mass, the surface area of lithium manganese oxide nanoparticles produced according to Comparative Example 4 become smaller than that of the nanoparticles produced according to Example 1 wherein a hydrothermal synthesis method is not applied. Thus, in case lithium manganese oxide nanoparticles produced according to Comparative Example 4 are used, the specific capacitance is remarkably lowered compared to that used the nanoparticles of Example 1

Comparative Example 5

$LiMn_2O_4$ nanoparticles in the shape of nanorods with a number average width of about 30 nm and a number average length of about 500 nm were prepared by the same method as Example 1, except that a $MnO_2$—$LiOH \cdot H_2O$ mixed powder was heat treated under an air atmosphere at about 400° C. for about 2 hours, and then the temperature was raised to about 500° C. and additional heat treatment was conducted for about 4 hours in step 1-2 of Example 1.

Figure 9:
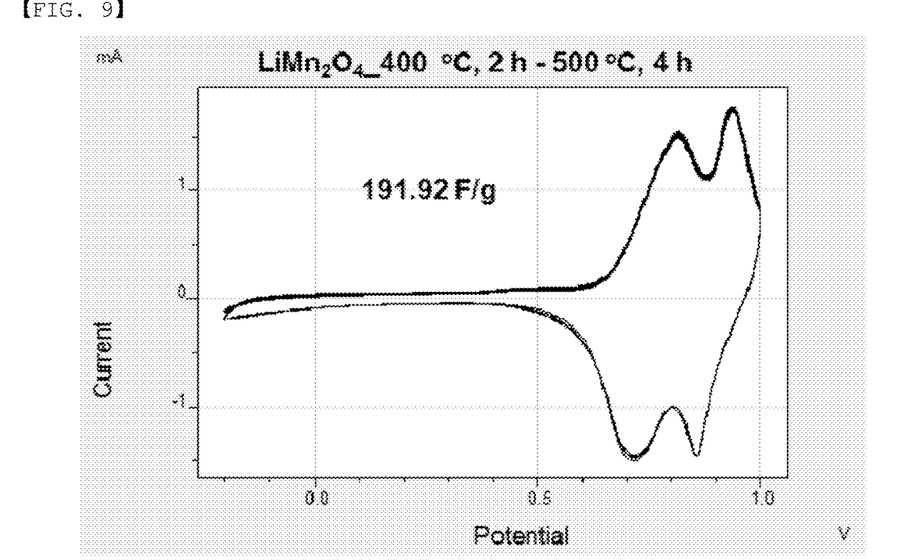
FIG. 9 is a CV graph determined by cyclic voltammetry, for the cathode electrode for pseudocapacitor prepared using the cathode active material including the $LiMn_2O_4$ nanoparticles prepared according to Comparative Example 5 (x axis: potential, y axis: current, specific capacitance: 191.92 F/g).

For a cathode electrode for a pseudocapacitor prepared using a lithium manganese oxide-based cathode active material including the produced $LiMn_2O_4$ nanoparticles, a CV graph was determined by cyclic voltammetry (CV) and is shown in FIG. 9. Herein, the specific capacitance measured by cyclic voltammetry was confirmed to be 191.92 F/g.

Comparative Example 6

$LiMn_2O_4$ nanoparticles in the shape of nanorods with a number average width of about 30 nm and a number average length of about 500 nm were prepared by the same method as Example 1, except that a $MnO_2$—$LiOH \cdot H_2O$ mixed powder was heat treated under an air atmosphere at about 400° C. for about 2 hours, and then the temperature was raised to about 800° C. and additional heat treatment was conducted for a reduced time of about 4 hours in step 1-2 of Example 1.

Figure 10:
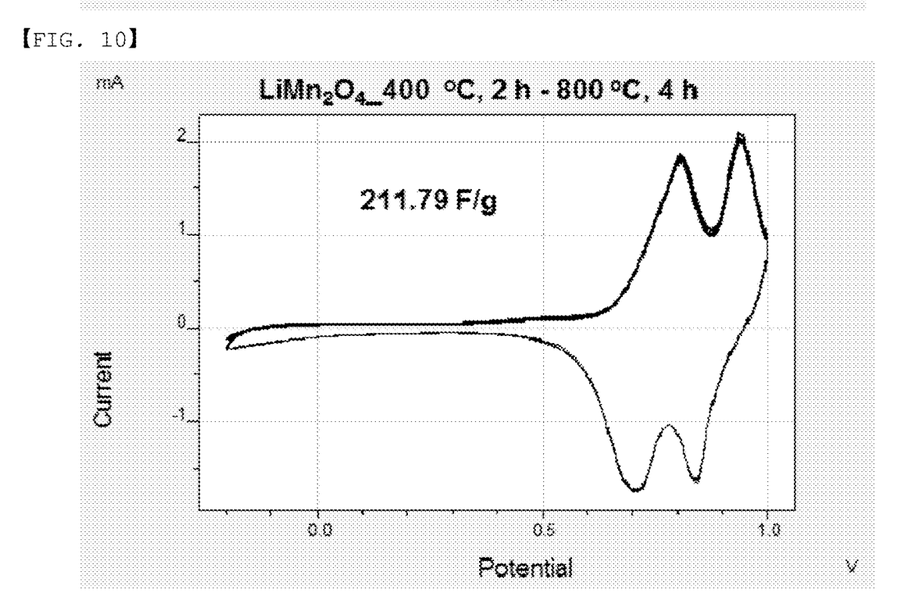
FIG. 10 is a CV graph determined by cyclic voltammetry, for the cathode electrode for a pseudocapacitor prepared using the cathode active material including the $LiMn_2O_4$ nanoparticles prepared according to Comparative Example 6 (x axis: potential, y axis: current, specific capacitance: 211.79 F/g).

For a cathode electrode for a pseudocapacitor prepared using a lithium manganese oxide-based cathode active material including the produced $LiMn_2O_4$ nanoparticles, a CV graph was determined by cyclic voltammetry (CV) and is shown in FIG. 10. Herein, the specific capacitance measured by cyclic voltammetry was confirmed to be 211.79 F/g.

Comparative Example 7

$LiMn_2O_4$ nanoparticles maintaining a nanorod shape with a number average width of about 70 nm and a number average length of about 200 nm were prepared by the same method as Example 1, except that a $MnO_2$—$LiOH \cdot H_2O$ mixed powder was heat treated under an air atmosphere at about 300° C. for about 4 hours, and then the temperature was raised to about 750° C. and additional heat treatment was conducted for a reduced time of about 24 hours in step 1-2 of Example 1.

For a cathode electrode for a pseudocapacitor prepared using lithium manganese oxide-based cathode active material including the produced $LiMn_2O_4$ nanoparticles, the specific capacitance measured by cyclic voltammetry was confirmed to be 201.45 F/g.

Comparative Example 8

Manganese salt $MnSO_4 \cdot H_2O$ and lithium salt $Li_2CO_3$ were mixed at a mole ratio of 2:1 without conducting step 1-1 of Example 1, and then heat treated under an air atmosphere at about 750° C. for about 10 hours, thus preparing $LiMn_2O_4$ particles having a size of about 1 micrometers to 5 micrometers.

For a cathode electrode for a pseudocapacitor prepared using lithium manganese oxide-based cathode active material including the produced $LiMn_2O_4$ nanoparticles, the specific capacitance measured by cyclic voltammetry was remarkably lowered to about 193.42 F/g.

Comparative Example 9

Figure 11:
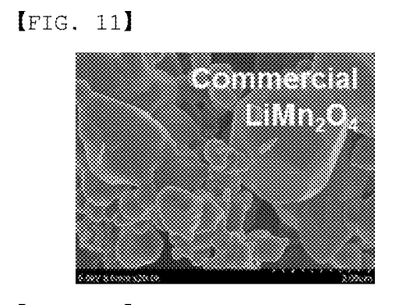
FIG. 11 is the SEM photograph taken at magnification of 20000 times of commercially available $LiMn_2O_4$ particles according to Comparative Example 9.
Figure 12:
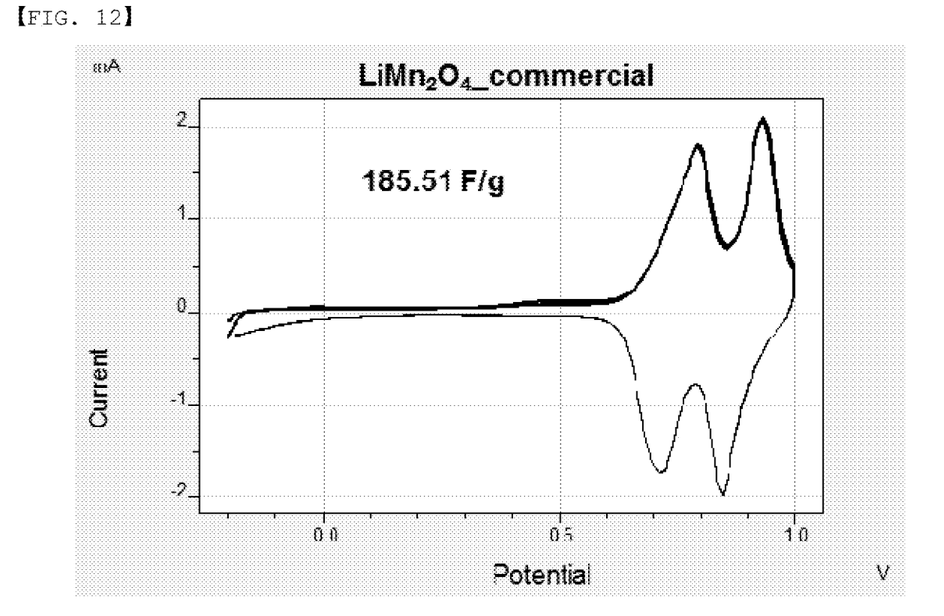
FIG. 12 is a CV graph determined by cyclic voltammetry, for the cathode electrode for a pseudocapacitor prepared using the cathode active material including commercially available $LiMn_2O_4$ particles according to Comparative Example 9 (x axis: potential, y axis: current, specific capacitance: 185.51 F/g).

A photograph was taken by a SEM (scanning electron microscope) of a commercially available lithium manganese oxide ($LiMn_2O_4$, electrochemical grade, 482277 Aldrich, less than 5 micrometers), and is shown in FIG. 11. For a cathode electrode for a pseudocapacitor prepared using the lithium manganese oxide, a CV graph was determined by cyclic voltammetry (CV) and is shown in FIG. 12. Herein, the specific capacitance measured by cyclic voltammetry was 185.51 F/g. Particularly, it can be seen that even $LiMn_2O_4$ commercially available as electrochemical grade has a very large particle size of a few micrometers, and thus the specific surface area is small, thus exhibiting low specific capacitance of just 185.51 F/g.

The invention claimed is:

1. A method for preparing a lithium manganese oxide-based material, comprising the steps of:
   producing manganese oxide nanoparticles using manganese salts; and
   mixing the manganese oxide nanoparticles with lithium salts and performing a heat treatment on the mixture, the heat treatment comprising performing a primary heat treatment stage at 350° C. to 430 ° C. for 1 hour to 3.5 hours, and then performing a secondary heat treatment stage at 650 ° C. to 750 ° C. for 2.5 hours to 8 hours, wherein a total time for performing all stages of the heat treatment does not exceed 11.5 hours.

2. The method for preparing lithium manganese oxide-based material according to claim 1,
   wherein the manganese salt is one or more selected from the group consisting of manganese sulfate, manganese acetate, manganese chloride, manganese nitrate, manganese carbonate, and hydrates or mixtures thereof.

3. The method for preparing a lithium manganese oxide-based material according to claim 1,
   wherein in the step of producing manganese oxide nanoparticles, the manganese salts are reacted in the presence of an oxidizing agent, under conditions of 50 ° C. or more and a pressure of 10 $kgf/cm^2$ or less.

4. The method for preparing a lithium manganese oxide-based material according to claim 3,
   wherein the oxidizing agent is one or more selected from the group consisting of potassium permanganate, aluminum persulfate, hydrogen peroxide, ferric chloride, and a hydrate, or a mixture thereof.

5. The method for preparing a lithium manganese oxide-based material according to claim 1,
   wherein the manganese oxide nanoparticles have nanorod shapes.

6. The method for preparing a lithium manganese oxide-based material according to claim 1,
   wherein the manganese oxide nanoparticles have a number average length of 200 nm to 2000 nm, and a number average width of 20 nm to 100 nm.

7. The method for preparing a lithium manganese oxide-based material according to claim 1,
   wherein the manganese oxide nanoparticles and lithium salts are mixed at a mole ratio of 2.3:0.7 to 1.7:1.3, and reacted.

8. The method for preparing a lithium manganese oxide-based material according to claim 1,
   wherein the heat treatment is conducted under an atmosphere containing oxygen or air.

9. The method for preparing a lithium manganese oxide-based material according to claim 1,
wherein the primary heat treatment stage is performed at 380 ° C. to 415 ° C. for 1.5 hours to 2.5 hours, and the secondary heat treatment stage is performed at 675 ° C. to 725 ° C. for 3 hours to 6 hours.

10. A lithium manganese oxide-based cathode active material prepared by the method according to claim 1.

11. The lithium manganese oxide-based cathode active material according to claim 10,
wherein the cathode active material has a shape of a nanorod.

12. The lithium manganese oxide-based cathode active material according to claim 10, wherein the nanorod cathode active material has a number average length is 200 nm to 2000 nm, and a number average width is 20 nm to 100 nm.

13. The lithium manganese oxide-based cathode active material according to claim 10,
wherein specific capacitance measured by cyclic voltammetry in a 1 M $Li_2SO_4$ electrolyte is 243 F/g or more.

14. A lithium manganese oxide-based material represented by Chemical Formula 1, $$Li_xMn_yO_z \qquad \text{[Chemical Formula 1]}$$

wherein in Chemical Formula 1,
wherein in Chemical Formula 1,
x is a real number in a range of 0.7 to 1.3, or 0.85 to 1.15,
y is a real number in a range of 1.7 to 2.3, or 1.85 to 2.15, and
z is determined according to the oxidation numbers of x and y,
wherein the lithium manganese oxide based material comprises nanorods having a number average length of 100 nm to 500 nm, a number average width of 20 nm to 200 nm, and a BET surface area of 5 $m^2$/g to 30 $m^2$/g.

* * * * *